(12) United States Patent
Zhao (10) Patent No.: US 9,086,707 B2
(45) Date of Patent: Jul. 21, 2015

(54) SYSTEM AND METHOD FOR MODULATING A DUTY CYCLE OF A SWITCHING MODE POWER SUPPLY

(71) Applicant: NVIDIA Corporation, Santa Clara, CA (US)

(72) Inventor: Yu Zhao, Guangdong (CN)

(73) Assignee: NVIDIA Corporation, Santa Clara, CA (US)

( * ) Notice: Subject to any disclaimer, the term of this patent is extended or adjusted under 35 U.S.C. 154(b) by 70 days.

(21) Appl. No.: 13/736,943

(22) Filed: Jan. 9, 2013

(65) Prior Publication Data

US 2014/0191735 A1      Jul. 10, 2014

(51) Int. Cl.
*G05F 1/00*     (2006.01)
*G05F 1/10*     (2006.01)

(52) U.S. Cl.
CPC ........................................ *G05F 1/10* (2013.01)

(58) Field of Classification Search
USPC .................. 323/234, 237, 241, 265, 282–285
See application file for complete search history.

(56) References Cited

U.S. PATENT DOCUMENTS

| | | | |
|---|---|---|---|
| 5,932,938 A * | 8/1999 | Shimamori | 307/125 |
| 6,809,504 B2 | 10/2004 | Tang et al. | |
| 7,391,192 B2 | 6/2008 | Ostrom et al. | |
| 7,443,148 B2 | 10/2008 | Weng | |
| 7,498,787 B2 * | 3/2009 | Leung et al. | 323/283 |
| 7,633,277 B1 | 12/2009 | Jacoby | |
| 8,006,106 B2 | 8/2011 | Sun | |
| 8,289,097 B2 * | 10/2012 | Putzeys | 332/106 |
| 8,581,651 B2 * | 11/2013 | Yong | 327/175 |
| 2004/0017234 A1 * | 1/2004 | Tam et al. | 327/141 |
| 2006/0127066 A1 * | 6/2006 | Chiu et al. | 388/804 |
| 2008/0162963 A1 | 7/2008 | Kung et al. | |
| 2008/0282102 A1 | 11/2008 | Reddy et al. | |
| 2010/0328976 A1 * | 12/2010 | Melanson | 363/131 |
| 2012/0217942 A1 * | 8/2012 | Kudo | 323/271 |

* cited by examiner

*Primary Examiner* — Jeffrey Gblende
(74) *Attorney, Agent, or Firm* — Zilka-Kotab, PC (57) ABSTRACT

Disclosed are methods, devices, and systems to digitally control a duty cycle of a switching mode power supply. In one embodiment, a method comprises calculating a base duty cycle using a power management unit of a high-speed processing unit, calculating a dynamic offset duty cycle using the power management unit to apply a transfer function to a sampled feedback voltage signal, and adding the base duty cycle to the dynamic offset duty cycle to obtain a duty cycle of the switching mode power supply. A system comprises a switching mode power supply, a power management unit, a voltage sensor, and an analog to digital converter all embedded within a high-speed processing unit, and a pulse-width modulator coupled between the switching mode power supply and the high-speed processing unit to modulate the duty cycle of the switching mode power supply.

15 Claims, 5 Drawing Sheets

SYSTEM AND METHOD FOR MODULATING A DUTY CYCLE OF A SWITCHING MODE POWER SUPPLY

FIELD OF TECHNOLOGY

This disclosure relates generally to power supply controllers, and more specifically, to systems and methods describing a digital duty cycle controller for a switching mode power supply.

BACKGROUND

Electronic equipment seldom utilize electric power in the same form that the electric power was originally received from the equipment's power source. Such electronic equipment may comprise a conversion device to convert power into a form that can be readily used by the electronic equipment. One type of conversion device may be a switching mode power supply (SMPS), which switches transistors on and off in order to transfer energy from the source to a load (such as a power consuming component in the electronic equipment) at an appropriate voltage. One example of such a load may be a graphics processing unit (GPU) of an integrated graphics card. When the GPU is undertaking complex imaging tasks or being turned on and off over a short period of time, the output voltage produced by an SMPS coupled to the GPU may deviate from a steady-state voltage until a controller or control circuit has had time to correct the deviation. Such deviations may be termed "transients," and a large transient may adversely affect the performance and integrity of the load (in this case, the GPU).

While an analog control circuit may be adapted to control such transients, such a control circuit may require one or more operational amplifiers and comparators. Such analog components may take up valuable layout space on a printed circuit board of an integrated graphics card and may result in an SMPS overshooting or undershooting the output voltage to correct for the transient. In cases where a GPU is the load in question, an analog duty cycle controller may exhibit significant delay in its response as the analog components of such a circuit cannot be integrated within the GPU and cannot sense and sample feedback voltages arising out of the core of the GPU.

SUMMARY

Disclosed are methods, devices and/or systems to digitally control a duty cycle of a switching mode power supply. In one aspect, a method to digitally control a duty cycle of a switching mode power supply comprises calculating a base duty cycle using a power management unit of a high-speed processing unit; calculating a dynamic offset duty cycle using the power management unit to apply a transfer function to a sampled feedback voltage signal; and adding the base duty cycle to the dynamic offset duty cycle to obtain a duty cycle of the switching mode power supply. In this aspect, an output voltage of the high-speed processing unit, an output current of the high-speed processing unit, an input voltage of the high-speed processing unit, and/or a set of parameters of a switching mode power supply coupled to the high-speed processing unit is used as a variable in such calculations.

The method may also involve obtaining the sampled feedback voltage signal by: sensing analog feedback voltages of the high-speed processing unit using a voltage sensor, converting the number of analog feedback voltages to digital voltage signals using an analog to digital converter, and sampling the number of digital voltage signals continuously to obtain the sampled feedback voltage signal using the power management unit. The method may also include modulating the duty cycle of the switching mode power supply using a pulse-width modulator coupled between the switching mode power supply and the high-speed processing unit.

The number of analog feedback voltages may be on-die feedback voltages of the high-speed processing unit. In addition, the voltage sensor may be embedded in the high-speed processing unit and sense the number of on-die feedback voltages of the high-speed processing unit.

Moreover, the set of parameters of the switching mode power supply may include a DC resistance of an inductor of the switching mode power supply, a resistance of a high-side MOSFET of the switching mode power supply, and/or a resistance of a low-side MOSFET of the switching mode power supply. The switching mode power supply may be a multi-phase switching mode power supply and an average duty cycle may be calculated for each phase of the multi-phase switching mode power supply.

In all aspects, the high-speed processing unit may be either a graphics processing unit (GPU) or a central processing unit (CPU). In addition, the power management unit may be embedded inside the high-speed processing unit and may be any of a digital signal processor, a microcontroller unit, or a digital signal controller.

Disclosed is also a digital duty cycle controller of a switching mode power supply, comprising a pulse-width modulator and a power management unit of a high-speed processing unit configured to: calculate a base duty cycle, calculate a dynamic offset duty cycle by applying a transfer function to a sampled feedback voltage signal, and add the base duty cycle to the dynamic offset duty cycle to obtain duty cycle of the switching mode power supply. In this case, an output voltage of the high-speed processing unit, an output current of the high-speed processing unit, an input voltage of the high-speed processing unit, and/or a set of parameters of the switching mode power supply coupled to the high-speed processing unit may be used as a variable in such calculations, The digital duty cycle controller may further comprise a voltage sensor to sense analog feedback voltages of the high-speed processing unit and an analog to digital converter to convert the number of analog feedback voltages to digital voltage signals. Moreover, the pulse-width modulator is coupled to the switching mode power supply and the high-speed processing unit to modulate the duty cycle of the switching mode power supply In this case, the power management unit may be embedded inside the high-speed processing unit and may be a digital signal processor, a microcontroller unit, or a digital signal controller configured to continuously sample the number of digital voltage signals to obtain the sampled feedback voltage signal. In addition, the number of analog feedback voltages may be on-die feedback voltages of the high-speed processing unit and the voltage sensor may be embedded in the high-speed processing unit and sense the number of on-die feedback voltages of the high-speed processing unit.

In addition, the set of parameters of the switching mode power supply may include a DC resistance of an inductor of the switching mode power supply, a resistance of a high-side MOSFET of the switching mode power supply, and/or a resistance of a low-side MOSFET of the switching mode power supply. The switching mode power supply of the digital duty controller may also be a multi-phase switching mode power supply and an average duty cycle may be calculated for each phase of the multi-phase switching mode power supply.

In all aspects of this disclosure, the high-speed processing unit may be a graphics processing unit (GPU) or a central processing unit (CPU).

Finally, disclosed is also a system to digitally control a duty cycle of a switching mode power supply. The system comprises the above mentioned switching mode power supply; a power management unit embedded inside a high-speed processing unit configured to calculate a base duty cycle, then calculate a dynamic offset duty cycle by applying a transfer function to a sampled feedback voltage signal, and then add the base duty cycle to the dynamic offset duty cycle to obtain a duty cycle of the switching mode power supply. In this case, an output voltage of the high-speed processing unit, an output current of the high-speed processing unit, an input voltage of the high-speed processing unit, and/or a set of parameters of the switching mode power supply coupled to the high-speed processing unit may be used as a variable in such calculations. The set of parameters of the switching mode power supply may include a DC resistance of an inductor of the switching mode power supply, a resistance of a high-side MOSFET of the switching mode power supply, and/or a resistance of a low-side MOSFET of the switching mode power supply.

In this system, the switching mode power supply may be a multi-phase switching mode power supply and an average duty cycle may be calculated for each phase of the multi-phase switching mode power supply and the high-speed processing unit may be a graphics processing unit (GPU) or a central processing unit (CPU).

The system also includes a voltage sensor to sense analog feedback voltages of the high-speed processing unit; an analog to digital converter to convert the number of analog feedback voltages to digital voltage signals; and a pulse-width modulator coupled between the switching mode power supply and the high-speed processing unit to modulate the duty cycle of the switching mode power supply. Moreover, the power management unit may be a digital signal processor, a microcontroller unit, or a digital signal controller embedded in the high-speed processing unit.

In this system, the power management unit may be configured to continuously sample the number of digital voltage signals to obtain the sampled feedback voltage signal. In addition, the number of analog feedback voltages may be on-die feedback voltages of the high-speed processing unit and the voltage sensor may be embedded in the high-speed processing unit and sense the number of on-die feedback voltages of the high-speed processing unit.

The methods, system, and/or apparatuses disclosed herein may be implemented in any means for achieving the various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements.

Other features of the present embodiments will be apparent from the accompanying drawings and from the detailed description that follows.

DETAILED DESCRIPTION

Disclosed are methods, devices, and systems to digitally control a duty cycle of a switching mode power supply. Although the present embodiments have been described with reference to specific example embodiments, it will be evident that various modifications and changes may be made to these embodiments without departing from the broader spirit and scope of the various embodiments.

Figure 1:
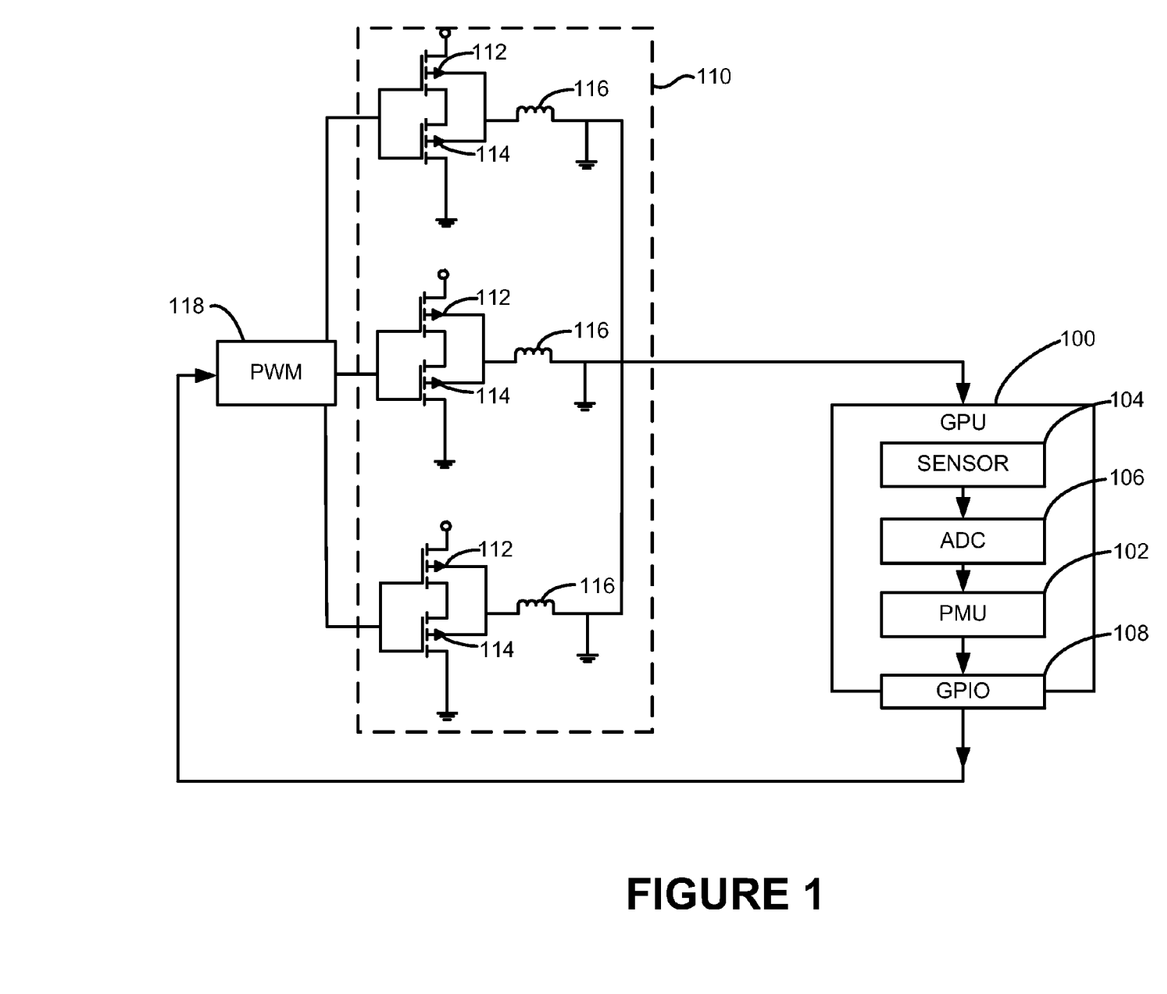
FIG. 1 depicts a digital duty cycle controller of a switching mode power supply, according to one embodiment.

Reference is now made to FIG. 1 which depicts a digital duty cycle controller of a switching mode power supply, according to one embodiment. As can be seen in FIG. 1, in one embodiment, the digital duty cycle controller comprises a power management unit (PMU) 102 of a high-speed processing unit 100 and a pulse-width modulator 118 coupled between a switching mode power supply 110 and a load to modulate the duty cycle of the switching mode power supply 110. If the load in question is the high-speed processing unit 100, then the digital duty cycle controller operates as a closed-loop system as shown in FIG. 1. In one embodiment, the power management unit 102 may be configured to first calculate a base duty cycle using a duty cycle formula for static operations; then calculate a dynamic offset duty cycle by applying a transfer function to a sampled feedback voltage signal; and then add the base duty cycle to the dynamic offset duty cycle to obtain a duty cycle of the switching mode power supply.

In one more embodiments, the duty cycle formula for static operations may use as variables: an output voltage of the high-speed processing unit, an output current of the high-speed processing unit, an input voltage of the high-speed processing unit, and/or a set of parameters of the switching mode power supply coupled to the high-speed processing unit. For example, one duty cycle formula that may be used in this instance is:

$$D_{Base} = \frac{V_{out} + I_{out} * (R_L + R_{onLS})}{V_{in} - I_{out} * (R_{onHS} - R_{onLS})}$$

Where $D_{Base}$ is the base duty cycle calculated, $V_{out}$ is the output voltage of the high-speed processing unit 100, $I_{out}$ is the output current of the high-speed processing unit 100, $V_{in}$ is the input voltage of the high-speed processing unit 100, $R_L$ is the DC resistance of the inductor 116, $R_{onLS}$ is the "on" state resistance of the low-side MOSFET 114, and $R_{onHS}$ is the "on" state resistance of the high-side MOSFET 112. In this embodiment, the DC resistance of the inductor 116 ($R_L$), the "on" state resistance of the low-side MOSFET 114 ($R_{onLS}$), and the "on" state resistance of the high-side MOSFET 112 ($R_{onHS}$) may be considered parameters of the switching mode power supply.

The digital duty cycle controller of FIG. 1 may further comprise a voltage sensor 104 to sense an analog feedback voltage of the high-speed processing unit 100 and an analog to digital converter (ADC) 106 to convert the analog feedback voltage to a digital voltage signal. In one embodiment, the load coupled to the switching mode power supply 110 is the high-speed processing unit 100. In this case, the voltage sensor 104 may be embedded within the high-speed processing unit 100 and the analog feedback voltages sensed by the voltage sensor 104 may be the on-die feedback voltages of the high-speed processing unit 100.

In this embodiment, the power management unit 102 may also be embedded inside the high-speed processing unit 100. The power management unit 102 may be a digital signal processor, a microcontroller unit, or a digital signal controller configured to continuously sample the digital voltage signals to obtain the sampled feedback voltage signal. In one embodiment, the digital signal processor may be implemented as any 8-bit to 64-bit processor capable of being integrated into the high-speed processing unit 100. The power management unit 102 may calculate a dynamic offset duty cycle by applying a transfer function to the sampled feedback voltage signal received from the voltage sensor 104 by way of the analog to digital converter 106. The transfer function used to undertake this calculation may be either a linear or non-linear function used to express the relationship between the system's output to its input in the complex Laplace domain. In one embodiment, the transfer function used for such calculations is a closed-loop transfer function.

The high-speed processing unit 100 may also comprise a general purpose input/output (GPIO) interface 108 to interface with the pulse-width modulator 118. The pulse-width modulator 118 may be implemented as any stand-alone or IC component modulator that can vary the pulse width or "on time" of a switching power supply. In one embodiment, the pulse-width modulator 118 may be a voltage mode pulse-width modulation controller having a supply voltage range of 7V to 40V.

As seen in FIG. 1, the switching mode power supply 110 of the digital duty controller may also be a multi-phase switching mode power supply and an average duty cycle may be calculated for each phase of the multi-phase switching mode power supply. As is known in the art, a multi-phase switching mode power supply places single-phase switches (also known as buck converters) in parallel between the power input and load. Each of the switches may be turned "on" at equally spaced periods over a switching interval. One advantage of multi-phase switching power supplies is that they can respond to load changes quickly and permit heat buildup on each of the switches to be spread across multiple switches. While an analog duty cycle controller may calculate a duty cycle for each of the switches of a multi-phase switch one at a time, the analog duty cycle controller inevitably becomes a bottleneck when the load requires switching schemes that are somewhat more complex. The digital duty cycle controller is more quickly able to handle complex multiple switching scenarios as the voltage sensor 104 can quickly sense the on-die feedback voltage of the load (which may be the high-speed processing unit 100 in one or more embodiments) as switch patterns change and the power management unit 102 can make any necessary calculations and changes based on this new information.

The digital duty cycle controller can also fine tune an average duty cycle for each of the switches based on a history of past switching behavior once the multi-phase switching mode power supply has operated for a short period. The pulse-width modulator 118 may then force each switch in the multi-phase switching mode power supply to adopt the same duty cycle profile so that the thermal load is evenly distributed amongst all of the switches.

In all aspects of this disclosure, the high-speed processing unit 100 may be a graphics processing unit (GPU) (as seen in FIG. 1) or a central processing unit (CPU).

Although the present embodiments have been described with reference to a digital duty cycle controller, it will be evident that various modifications and changes may be made to these embodiments without departing from the broader spirit and scope of the various embodiments. For example, the digital duty cycle controller may be expressed as part of a system to digitally control a duty cycle of a switching mode power supply. The system comprises the above mentioned switching mode power supply 110; the power management unit 102 embedded inside the high-speed processing unit 100; the voltage sensor 104 to sense analog feedback voltages of the high-speed processing unit 100; the analog to digital converter 106 to convert the analog feedback voltages to digital voltage signals; and a pulse-width modulator 118 coupled between the switching mode power supply 110 and the high-speed processing unit 100 to modulate the duty cycle of the switching mode power supply 110.

Similar to the above, the power management unit 102 of this system is configured to first calculate a base duty cycle using a duty cycle formula for static operations; then calculate a dynamic offset duty cycle by applying a transfer function to a sampled feedback voltage signal; and then add the base duty cycle to the dynamic offset duty cycle to obtain a duty cycle of the switching mode power supply. In this system, the static operation duty cycle formula and the transfer function described above can also be used to calculate the base duty cycle and the dynamic offset duty cycle, respectively.

The switching mode power supply 110 of the system may be a multi-phase switching mode power supply as shown in FIG. 1 where three buck converters are arranged as shown to achieve the circuitry of FIG. 1. Using this system, an average duty cycle may be calculated for each phase of the multi-phase switching mode power supply 110. Finally, the high-speed processing unit 100 of this system may be a graphics processing unit (GPU), as shown in FIGS. 1 and 2, or a central processing unit (CPU).

Moreover, the power management unit 102 embedded in the high-speed processing unit 100 may be implemented as a digital signal processor, a microcontroller unit, or a digital signal controller embedded in the high-speed processing unit. The power management unit 102 may be configured to continuously sample digital voltage signals to obtain the sampled feedback voltage signal. In addition, the analog feedback voltages sensed by the voltage sensor 104 may be on-die feedback voltages of the high-speed processing unit and the voltage sensor 104 may be embedded in the high-speed processing unit 100.

Both the digital duty cycle controller described above and the system may be configured to be integrated into a computer graphics card, a mobile graphics card, a computer video adapter, a mobile video adapter, a computer graphics adapter, and/or a mobile graphics adapter. In one or more embodiments, the computer graphics card may be any of NVIDIA's® GeForce® line of graphics cards, including: the GTX 650® card, the GTX 660® card, the GTX 670® card, the GTX 680® card, and/or the GTX 690® card. The switching mode power supply 110, the GPU 100, and the pulse-width modulator 118 may be coupled to one another through high-speed buses and interfaces.

Figure 2:
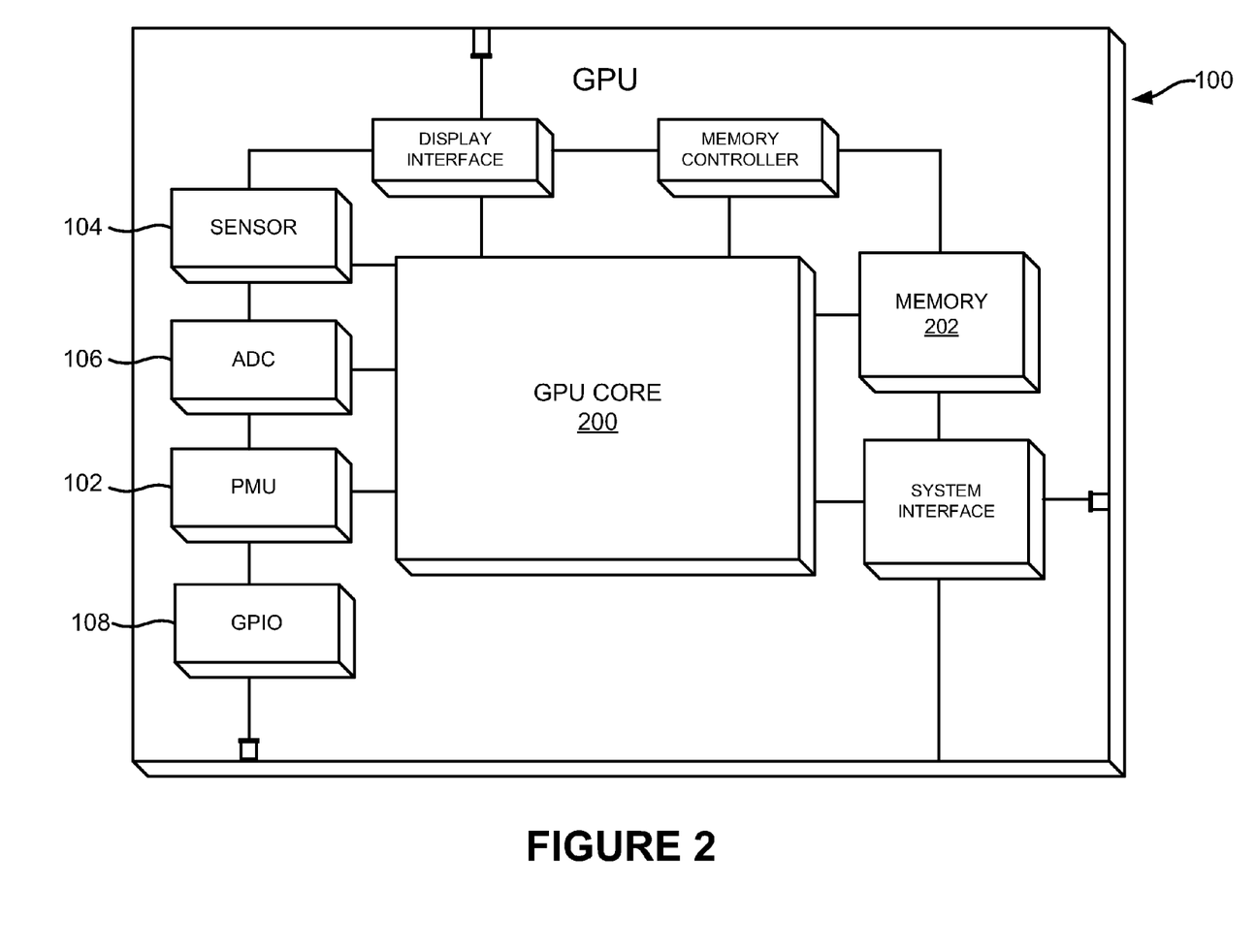
FIG. 2 depicts a simplified block diagram of a high-speed processing unit used by the digital duty cycle controller of FIG. 1, according to one embodiment.

Reference is now made to FIG. 2, which depicts a simplified block diagram of the high-speed processing unit 100 of FIG. 1, according to one or more embodiments. The example environment depicted in FIG. 2 is only one representative environment and real-world environments may contain many more components and/or interface pathways. As seen in FIG. 2, the high-speed processing unit 100 may be a graphics processing unit (GPU) comprising the voltage sensor 104, the analog to digital converter 106, the power management unit 102, and the general purpose input/output interface 108. The high-speed processing unit 100 may also comprise a GPU core 200 and a memory 202. The voltage sensor 104, the analog to digital converter 106, the power management unit 102, and the general purpose input/output interface 108 may all interface with the GPU core 200 through one or more buses that allow these components to take advantage of the processing units in the core of the GPU.

The power management unit 102 may use the processors embedded inside the GPU core 200 to calculate the base duty cycle and/or the dynamic offset duty cycle. The results of such calculations may be stored in a memory embedded inside the power management unit 102 (not presently shown in FIG. 2) or in the GPU's memory 202. Moreover, instructions for how to undertake such calculations may be stored in either memory 202 or memory embedded inside the power management unit 102 and may be executed by one or more processors in the power management unit 102 and/or in the GPU core 200. The memory 202 or the memory embedded inside the power management unit 102 may be implemented as flash memory or any type of non-volatile storage.

To obtain the sampled feedback voltage, the voltage sensor 104 may sense an analog feedback voltage of the load (in this case, the high speed processing unit 100 or GPU) and send that sensed signal to the analog to digital converter 106. While the present figure shows the analog to digital converter 106 as separated from the voltage sensor 104, either component can be integrated with the other in alternative embodiments to achieve the purpose recited above. The analog to digital converter 106 may also store its converted digital signals in memory 202 and/or a memory embedded inside either the power management unit 102 or the analog to digital converter 106. The power management unit 102 may then sample the stored digital voltage signals continuously to obtain any changes in the sensed voltage (also known as the "slew rate"). The power management unit 102 can then use this sampled data to calculate an offset duty cycle or a dynamic offset duty cycle by applying any number of transfer functions (e.g., a closed-loop transfer function) to the sample feedback voltage. Finally, the power management unit 102 can add the calculated base duty cycle to the calculated dynamic offset duty cycle to obtain a duty cycle of the switching mode power supply 110 that more accurately reflects the activity of the load (in this case, the high-speed processing unit 100 or GPU).

Once the above duty cycle has been calculated, the power management unit 102 may then send this duty cycle to the pulse-width modulator 118 through the high-speed processing unit 100's general purpose input/output interface 108. Finally, some of the labeled blocks shown in FIG. 2 may be implemented as separate IC controllers or other external circuits and some of the components not shown in the present figure may be integrated into the high-speed processing unit 100.

Figure 3:
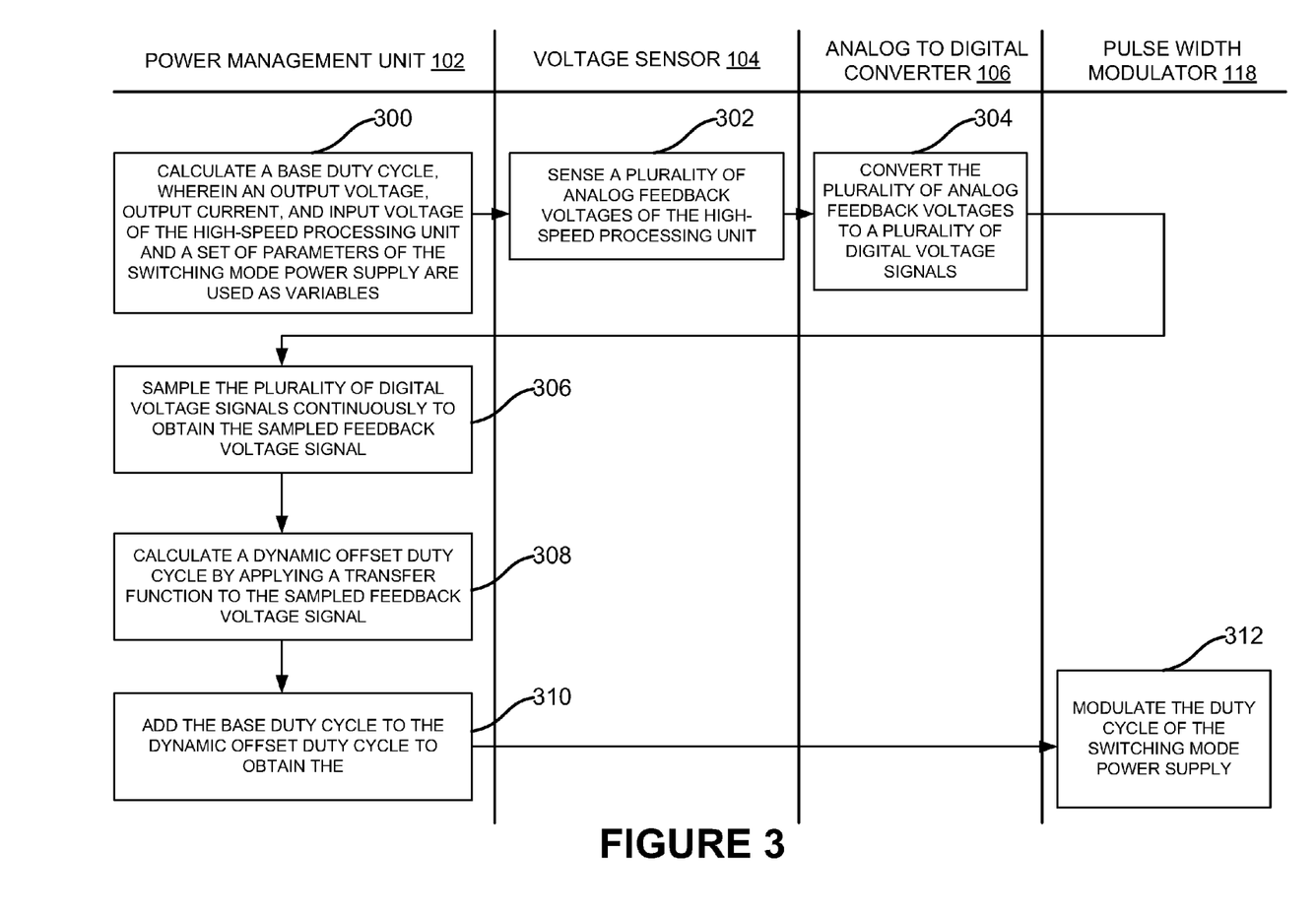
FIG. 3 is a process flow diagram depicting a method of digitally controlling a duty cycle using the digital duty cycle controller of FIG. 1, according to one embodiment.

FIG. 3 is a process flow diagram depicting a method of digitally controlling a duty cycle using the digital duty cycle controller of FIG. 1, according to one embodiment. While the process flow diagram is described with respect to components indicated in FIGS. 1 and 2, various features of the present disclosure can be implemented in other environments, and with other components. In one embodiment, operation 300 of the method comprises calculating a base duty cycle using a power management unit 102 of a high-speed processing unit 100. Operation 302 then involves sensing analog feedback voltages of the high-speed processing unit 100 using the voltage sensor 104. In addition, operation 304 involves converting the analog feedback voltages to digital voltage signals using an analog to digital converter 106.

Operation 306 then involves, once again, using the power management unit 306 to sample the digital voltage signals continuously to obtain the sampled feedback voltage signal. Furthermore, operation 308 involves calculating a dynamic offset duty cycle using the power management unit 102 to apply a transfer function to a sampled feedback voltage signal and operation 310 involves using the power management unit 102 to add the base duty cycle to the dynamic offset duty cycle to obtain a corrected duty cycle of the switching mode power supply 110. Finally, the method involves operation 312 to modulate the duty cycle of the switching mode power supply 110 using the pulse-width modulator 118 coupled to the switching mode power supply 110 and the high-speed processing unit 100.

In this method, an output voltage of the high-speed processing unit 100, an output current of the high-speed processing unit 100, an input voltage of the high-speed processing unit 100, and/or a set of parameters of the switching mode power supply 110 coupled to the high-speed processing unit 100 is used as a variable in the above calculations. In this method, the number of analog feedback voltages may be on-die feedback voltages of the high-speed processing unit 100. In addition, the voltage sensor 104 may be embedded in the high-speed processing unit 100 and sense the number of on-die feedback voltages of the high-speed processing unit 100.

Moreover, the set of parameters of the switching mode power supply 110 may include a DC resistance of the inductor 116 of the switching mode power supply 110, a resistance of the high-side MOSFET 112 of the switching mode power supply 110, and/or a resistance of a low-side MOSFET 114 of the switching mode power supply 110. The switching mode power supply 110 may be a multi-phase switching mode power supply as shown in FIG. 1 and an average duty cycle may be calculated for each phase of the multi-phase switching mode power supply.

In all such cases, the high-speed processing unit 100 may be either a graphics processing unit (GPU) or a central processing unit (CPU). In addition, the power management unit 102 is embedded inside the high-speed processing unit 100 and may be any of a digital signal processor, a microcontroller unit, or a digital signal controller.

Figure 4:
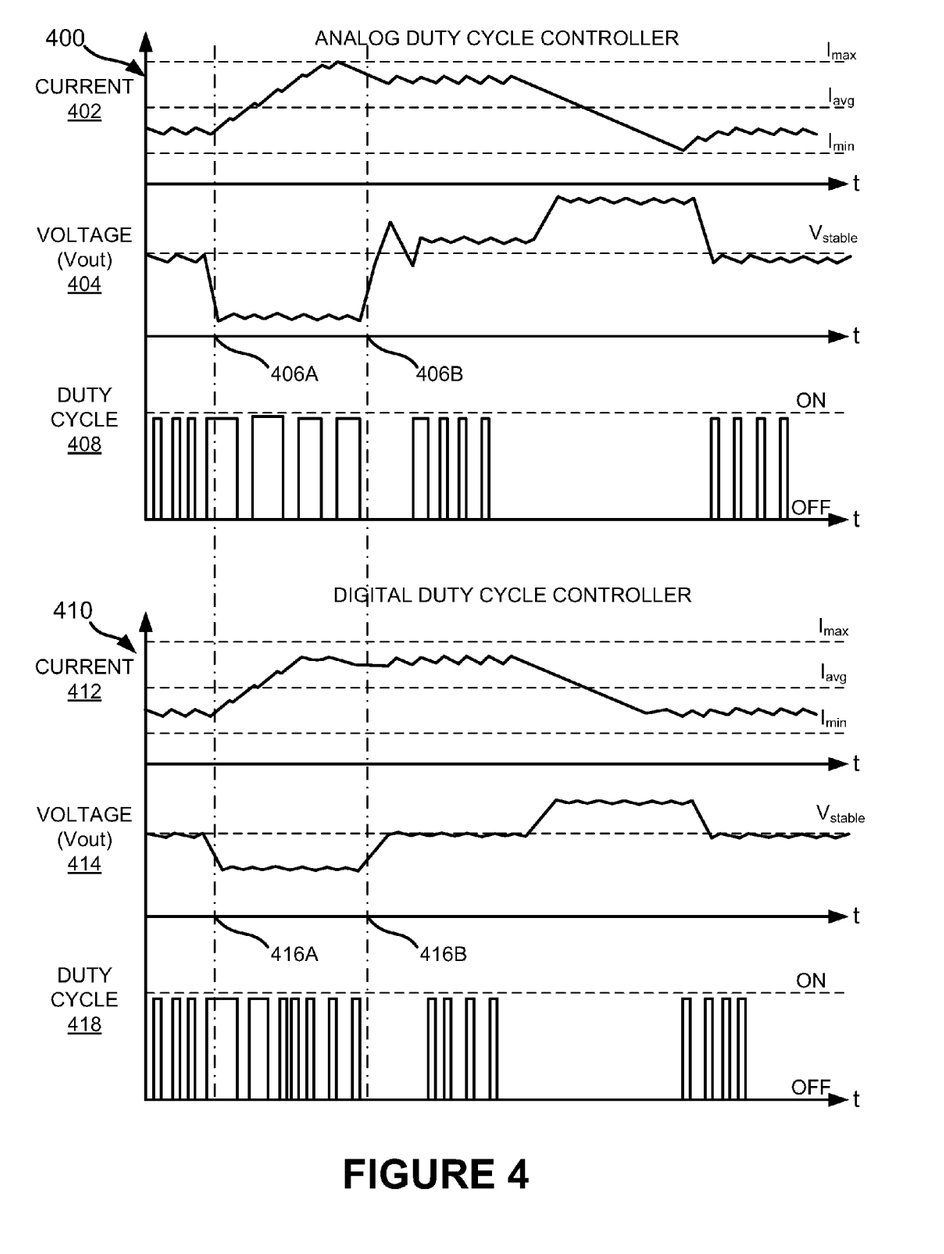
FIG. 4 is a timing diagram comparison of duty cycles produced by an analog duty cycle controller compared against duty cycles produced by the digital duty cycle controller of FIG. 1, according to one embodiment.

FIG. 4 is a timing diagram comparison illustrating the operation of an analog duty cycle controller compared against the operation of the digital duty cycle controller of FIG. 1, according to one embodiment. As shown in FIG. 4, diagram 400 illustrates the current 402, voltage 404, and duty cycle 408 behavior of an analog duty cycle controller while diagram 410 illustrates the current 412, voltage 414, and duty cycle 418 behavior of the digital duty cycle controller of FIG. 1. In both diagrams 400 and 410, the x-axis signify time and the y-axes signify current, voltage, and the "on/off" state of a set of duty cycles as indicated in the diagrams. In the case of an analog duty cycle controller, the controller may rely on a simple analog feedback mechanism to obtain a duty cycle for a switching mode power supply (that is, where the feedback voltage is sensed by an operational amplifier of the controller). Under such a scenario, the analog duty cycle controller may either over- or under-adjust the duty cycle since the controller may only have access to recently acquired $V_{out}$ feedback information and cannot base its decisions on a history of $V_{out}$ behavior.

For example, as shown in diagram 400, an analog duty cycle controller would consider the voltage 404 behavior at time 406A and the voltage 404 behavior at time 406B to be similar even though the rate of change (or slew rate) of voltage 404 is clearly negative at time 406A. In this case, the analog duty cycle controller would turn on and extend the duty cycle as long as possible to counter such a voltage drop. As can be seen from diagram 400, the duty cycle 408 is turned on and extended but the analog duty cycle controller may keep the duty cycle turned on well past the point needed to raise the voltage back to $V_{stable}$. By not turning off the duty cycle sooner, the controller overshoots $V_{stable}$, resulting in a voltage swing that may be harmful to the load.

In the case of the digital duty cycle controller, the control logic of such a controller is more complex owing to the controller's ability to sense the on-die feedback voltage of the high-speed processing unit 100 and its ability to take advantage of the processing power of the power management unit 102 and/or the GPU core 200 of the high-speed processing unit 100. Unlike its analog counterpart, the digital duty cycle controller can continuously sample the feedback voltages it has sensed and can compile a history of such voltage behavior. Based on such a history, the digital duty cycle controller can distinguish between the voltage behavior 414 at time 416A and the voltage behavior 414 at time 416B. By doing so, the controller may instruct the switching mode power supply to produce an extended duty cycle 418 at time 416A and to gradually decrease such a duty cycle before turning it off completely at time 416B to minimize the possibility of an overshoot. In this way, the transients depicted in diagram 400 are reduced and the load is exposed to less harm from inaccurate and delayed voltage adjustments.

Figure 5:
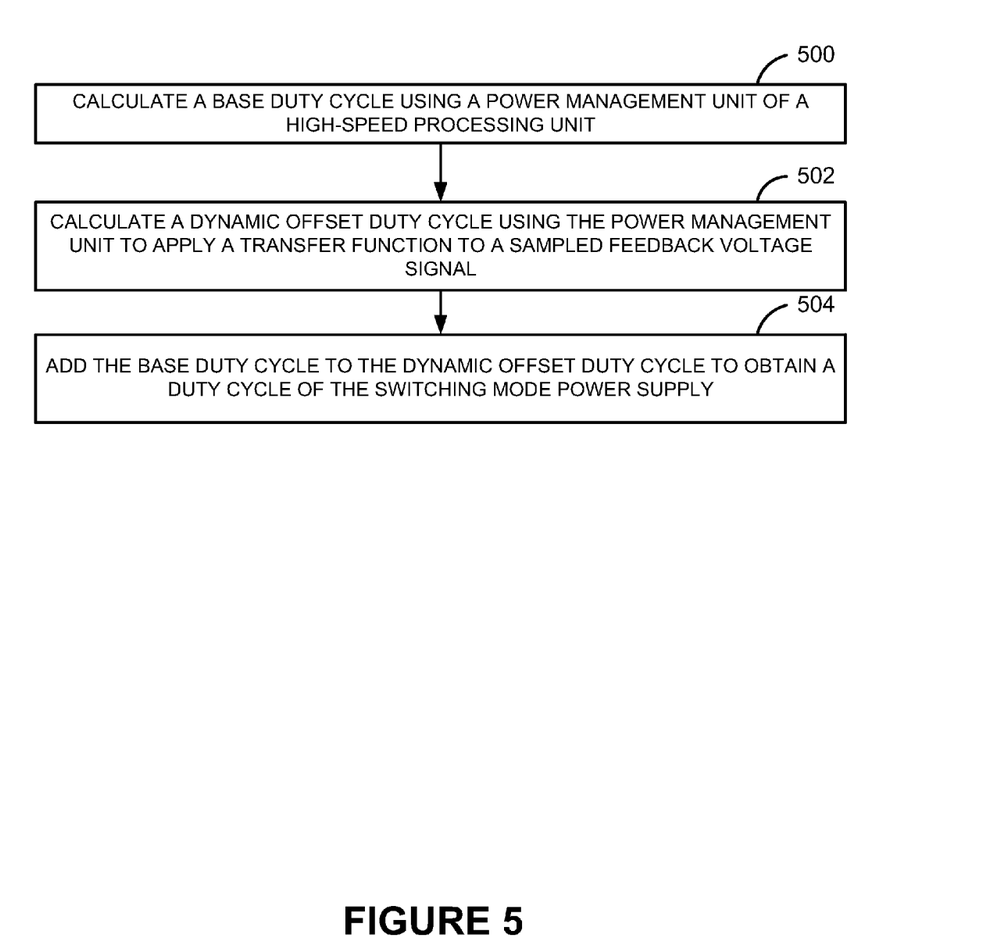
FIG. 5 is a brief process flow diagram depicting a method of digitally controlling a duty cycle using the digital duty cycle controller of FIG. 1, according to one embodiment.

FIG. 5 is a brief process flow diagram depicting the essential method of digitally controlling a duty cycle using the digital duty cycle controller of FIG. 1, according to one embodiment. Operation 500 involves calculating a base duty cycle using the power management unit 102 of the high-speed processing unit 100. Operation 502 involves calculating a dynamic offset duty cycle using the power management unit 102 to apply a transfer function to a sampled feedback voltage signal. Finally, operation 504 involves adding the base duty cycle to the dynamic offset duty cycle to obtain a corrected duty cycle for the switching mode power supply to deliver to a dynamic load.

Although the present embodiments have been described with reference to specific example embodiments, it will be evident that various modifications and changes may be made to these embodiments without departing from the broader spirit and scope of the various embodiments.

What is claimed is:

1. A method, comprising:
    calculating, by a power management unit of a high-speed processing unit, a base duty cycle based on at least one of an output voltage of the high-speed processing unit, an output current of the high-speed processing unit, an input voltage of the high-speed processing unit, and a set of parameters of a switching mode power supply coupled to the high-speed processing unit;
    calculating a dynamic offset duty cycle by:
        sensing a plurality of on-die analog feedback voltages of the high-speed processing unit using a voltage sensor that is embedded in the high-speed processing unit;
        converting the plurality of on-die analog feedback voltages to a plurality of digital voltage signals;
        sampling the plurality of digital voltage signals continuously to obtain a sampled feedback voltage signal; and
        applying a transfer function to the sampled feedback voltage signal to produce the dynamic offset duty cycle; and
    adding the base duty cycle to the dynamic offset duty cycle to obtain a duty cycle of a switching mode power supply.

2. The method of claim 1, wherein the set of parameters of the switching mode power supply include at least one of a DC resistance of an inductor of the switching mode power supply, a resistance of a high-side MOSFET of the switching mode power supply, and a resistance of a low-side MOSFET of the switching mode power supply.

3. The method of claim 2, wherein the switching mode power supply is a multi-phase switching mode power supply and an average duty cycle is calculated for each phase of the multi-phase switching mode power supply.

4. The method of claim 1, wherein the high-speed processing unit is at least one of a graphics processing unit (GPU) and a central processing unit (CPU).

5. The method of claim 1, wherein the power management unit is embedded inside the high-speed processing unit and is at least one of a digital signal processor, a microcontroller unit, and a digital signal controller.

6. The method of claim 1, further comprising:
    modulating the duty cycle of the switching mode power supply using a pulse-width modulator coupled between the switching mode power supply and the high-speed processing unit.

7. A controller of a switching mode power supply, comprising:
    a power management unit of a high-speed processing unit configured to:
        calculate a base duty cycle based on at least one of an output voltage of the high-speed processing unit, an output current of the high-speed processing unit, an input voltage of the high-speed processing unit, and a set of parameters of the switching mode power supply coupled to the high-speed processing unit,
        calculate a dynamic offset duty cycle by applying a transfer function to a sampled feedback voltage signal, and
        add the base duty cycle to the dynamic offset duty cycle to obtain a duty cycle of the switching mode power supply;
    a voltage sensor that is embedded in the high-speed processing unit and senses a plurality of on-die analog feedback voltages of the high-speed processing unit;
    an analog to digital converter to convert the plurality of on-die analog feedback voltages to a plurality of digital voltage signals, and wherein the power management unit is configured to continuously sample the plurality of digital voltage signals to obtain the sampled feedback voltage signal; and
    a pulse-width modulator coupled between the switching mode power supply and the high-speed processing unit to modulate the duty cycle of the switching mode power supply.

8. The controller of claim 7, wherein the set of parameters of the switching mode power supply include at least one of a DC resistance of an inductor of the switching mode power supply, a resistance of a high-side MOSFET of the switching mode power supply, and a resistance of a low-side MOSFET of the switching mode power supply.

9. The controller of claim 7, wherein the switching mode power supply is a multi-phase switching mode power supply and an average duty cycle is calculated for each phase of the multi-phase switching mode power supply.

10. The controller of claim 7, wherein the high-speed processing unit is at least one of a graphics processing unit (GPU) and a central processing unit (CPU).

11. The controller of claim 7, wherein the power management unit is embedded inside the high-speed processing unit and is at least one of a digital signal processor, a microcontroller unit, and a digital signal controller.

12. A system to digitally control a switching mode power supply, comprising:
a switching mode power supply configured to deliver at least one of a steady-state output voltage and a steady-state output current;
a high-speed processing unit that is coupled to the switching mode power supply and comprises:
a power management unit configured to:
calculate a base duty cycle based on at least one of an output voltage of the high-speed processing unit, an output current of the high-speed processing unit, an input voltage of the high-speed processing unit, and a set of parameters of the switching mode power supply coupled to the high-speed processing unit is used as a variable in such calculations,
calculate a dynamic offset duty cycle by applying a transfer function to a sampled feedback voltage signal, and
add the base duty cycle to the dynamic offset duty cycle to obtain a duty cycle of the switching mode power supply;
a voltage sensor, embedded in the high-speed processing unit, to sense a plurality of on-die analog feedback voltages of the high-speed processing unit; and
an analog to digital converter to convert the plurality of on-die analog feedback voltages to a plurality of digital voltage signals, and wherein the power management unit is configured to continuously sample the plurality of digital voltage signals to obtain the sampled feedback voltage signal; and
a pulse-width modulator coupled between the switching mode power supply and the high-speed processing unit to modulate the duty cycle of the switching mode power supply.

13. The system of claim 12, wherein the set of parameters of the switching mode power supply include at least one of a DC resistance of an inductor of the switching mode power supply, a resistance of a high-side MOSFET of the switching mode power supply, and a resistance of a low-side MOSFET of the switching mode power supply.

14. The system of claim 12, wherein the switching mode power supply is a multi-phase switching mode power supply and an average duty cycle is calculated for each phase of the multi-phase switching mode power supply and the high-speed processing unit is at least one of a graphics processing unit (CPU) and a central processing unit (CPU).

15. The system of claim 12, wherein the power management unit is embedded inside the high-speed processing unit and is at least one of a digital signal processor, a microcontroller unit, and a digital signal controller.

* * * * *